Dec. 7, 1943.   R. W. MUELLER   2,336,282
VALVE
Filed Sept. 11, 1942

INVENTOR
Richard W. Mueller
by W. G. Doolittle
Attorney

Patented Dec. 7, 1943

2,336,282

UNITED STATES PATENT OFFICE 2,336,282

VALVE

Richard W. Mueller, Pittsburgh, Pa., assignor to Kerotest Manufacturing Company, Pittsburgh, Pa., a corporation of Pennsylvania Application September 11, 1942, Serial No. 457,936

1 Claim. (Cl. 277—29)

This invention relates to improvements in valves and more particularly to a combined pressure actuated and a coacting manually operable valve structure particularly designed for use in connection with high pressure fluid tanks or containers and the like. For example, a carbonic-acid gas ($CO_2$) fire extinguisher.

One of the prime objects of the present invention is the provision of a valve structure of the character stated in which simple and efficient means are incorporated therein to prevent leakage of fluids from the container even when the structure has not been used for a considerable length of time.

My invention contemplates the employment of a plurality of coacting valve assemblies positioned between the fluid inlet and the fluid outlet, said assemblies preferably including a pressure actuated valve and a manually operable valve arranged and coacting to control the passage of fluids from the inlet to the outlet of the valve structure and to effect a highly efficient and permanent seal during non-use of the structure.

My invention further contemplates a valve structure in which the valves proper are simultaneously operated by the manipulation of a single manually operated stem, whereby a double seat shut off below the outlet of the valve structure is produced and by which a simultaneous opening of the valves proper is effected.

Figure 1:
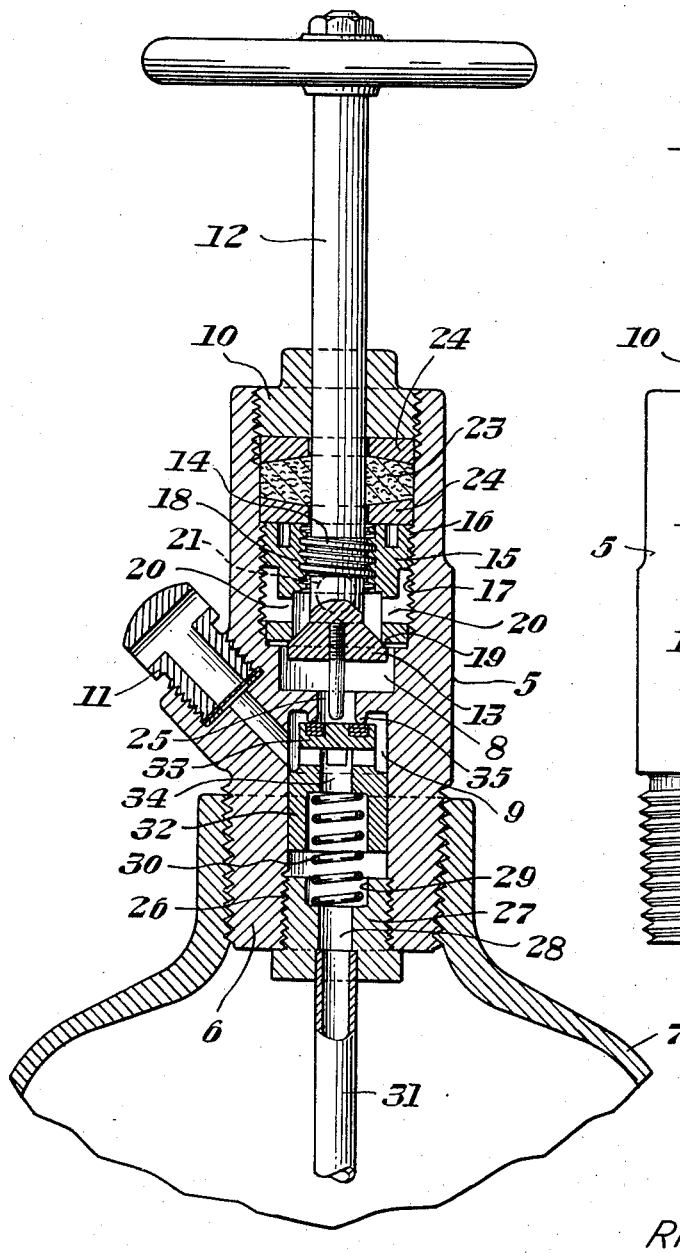
Figure 2:
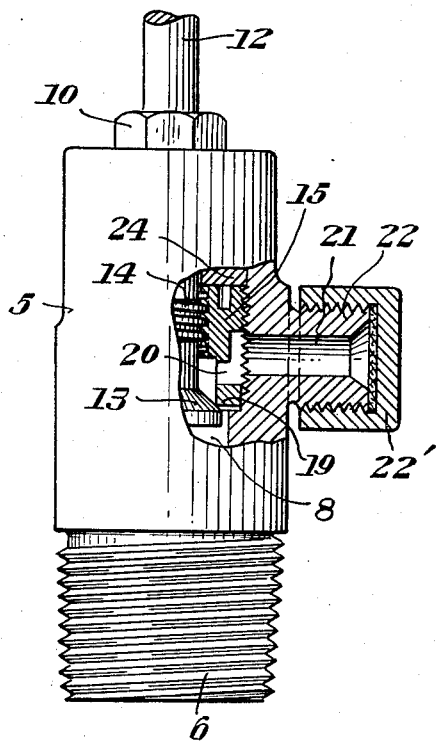

In the accompanying drawing which illustrates an application of my invention:

Fig. 1 is a longitudinal sectional view of a valve embodying my invention shown applied to a pressure cylinder; and Fig. 2 a part elevational and a part sectional view, the view being taken at right angles to the view of Fig. 1.

Referring to the drawing, 5 designates generally the valve casing or body preferably formed with a threaded nozzle 6 adapted for mounting and attaching the valve structure to a high fluid pressure container or the like 7.

As illustrated and as preferred the interior of the valve body is formed with a longitudinal extending bore divided into first and second chambers 8 and 9, said chambers being disposed in vertical alinement with one another and respectively designed to contain a manually operated valve assembly and a pressure actuated valve assembly. The upper end of the casing is closed by a plug cap 10 having exterior threads to cooperate with an internally threaded portion of the bore of the casing. 11 designates a pressure relief or safety valve device in communication with the second chamber 9, of any well known construction.

The manually operated valve assembly as shown includes a valve-stem 12 having left hand threads and a valve-head 13 at its inner end. Intermediate the ends of the valve-stem, the stem is provided with the left hand screw-threads 14 adapted to cooperate with a hollow bushing 15. Bushing 15 is formed with external threads at 16 to engage an internally threaded portion 17 of the bore of the casing and with threads 18 to cooperate with the threads 14 of the stem. Bushing 15 is also further formed with a valve-seat 19 and with ports or passages 20 designed to communicate with an outlet passage 21 of an outlet nozzle 22 formed on the valve body closed by a cap 22'. Interposed between the bushing 15 and the inner end of the plug cap 10, I preferably employ a packing 23 disposed between washers 24.

The valve-head 13 may be made of any suitable material and is provided with a depending plunger or pin 25 designed to be moved into and out of contact with the valve proper of the pressure actuated valve assembly. It will be understood that the head 13 functions as a back seating shut-off valve.

Referring now particularly to the pressure actuated valve assembly it will be noted that the lower portion of the wall of chamber 9 is threaded at 26 to receive and secure an externally threaded plug or element 27 having a fluid passage 28 and an enlarged recess 29, the latter being designed to receive and seat a spring 30. 31 designates a tubing projecting downwardly from element 27 into the interior of the container 7 through which fluid under pressure is passed from the container into the chamber 9.

32 designates a slidable and ported member supported by spring 30 having a valve-head 33 and passage 34 in open communication with chamber 9. The head 33 is designed to be moved into and out of contact with a valve-seat 35 formed on a wall of chamber 9.

The movable parts of the valve structure as shown by the drawing are in closed positions thus preventing passage of fluid from the container to the outlet nozzle. In this position the manually operated valve-head 13 is in close contact with its seat 19 and the pressure actuated valve in contact with its seat 35. From the arrangement and combination of elements shown it will be understood that a downward or inner movement of the operating stem will cause an opening of valve-head 13 and, due to the fact that plunger pin 25 contacts with the head of the pressure actuated assembly this head will be simultaneously moved from its seat to open position. A reverse movement of the manually operable valve device will cause the head 13 to back-seat and also cause a seating of the pressure operated valve. In some instances I find that I may omit the spring 30 and depend entirely on the tank pressure to seat the valve-head 33. It will be understood that the pressure relief valve device will function as usual should the fluid pressure become too great in chamber 9.

I claim:

A valve comprising a casing having a chamber extending inwardly from one end thereof, a hollow bushing insertable through the said end of said chamber and disposed in the inner portion of said chamber and threaded to the casing and having a valve seat at its inner end, the casing having an outlet between said end and said seat, a stem screw-threaded to said bushing provided with a valve head impassable through the bushing and coacting with said seat, a plug cap through which said stem passes screwed to the said end of the casing, packing means in said chamber through which said stem passes clamped between said plug cap and bushing, a second chamber extending inwardly from the other end of the casing, a partition on the casing between said chambers having a port therebetween and provided with a valve seat facing in the same direction as the first valve seat, a tubular plug screw-threaded to the casing at the entrance of the second chamber, a slidable ported valve held in the second chamber between said tubular plug and second mentioned seat for engagement with the latter through pressure, and means on one valve head extending through said port and coacting with the other valve head so that the valve heads will approximately simultaneously operate.

RICHARD W. MUELLER.